April 24, 1945.   H. L. MacNEILL ET AL   2,374,365
TURNING MACHINE CONTROLLED BY THE DIAMETER OF THE WORK
Filed Aug. 30, 1944   5 Sheets-Sheet 1

Inventors:
Harris L. MacNeill,
Arden B. MacNeill,
by Spear, Rawlings & Spear.
Attorneys

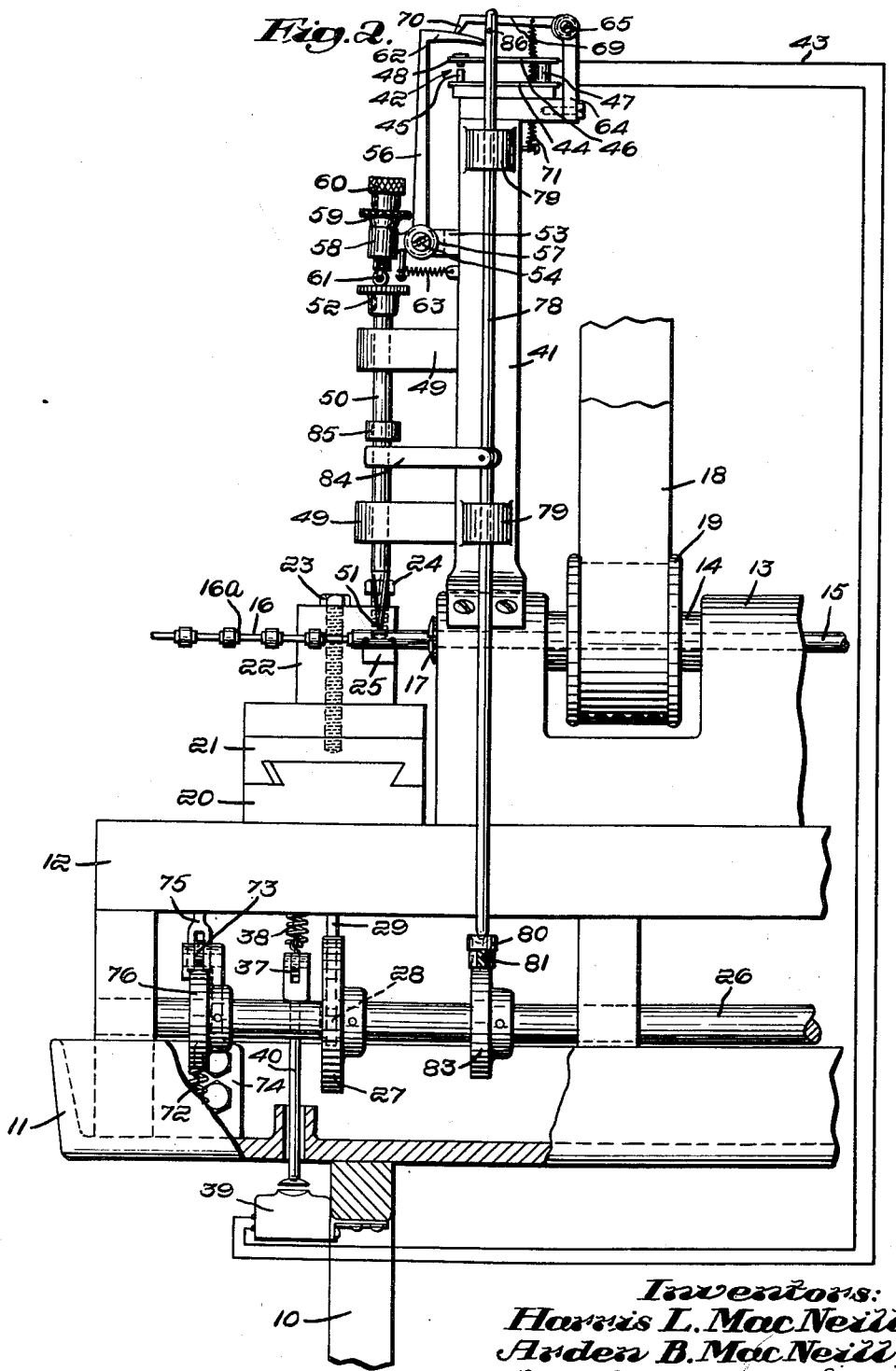

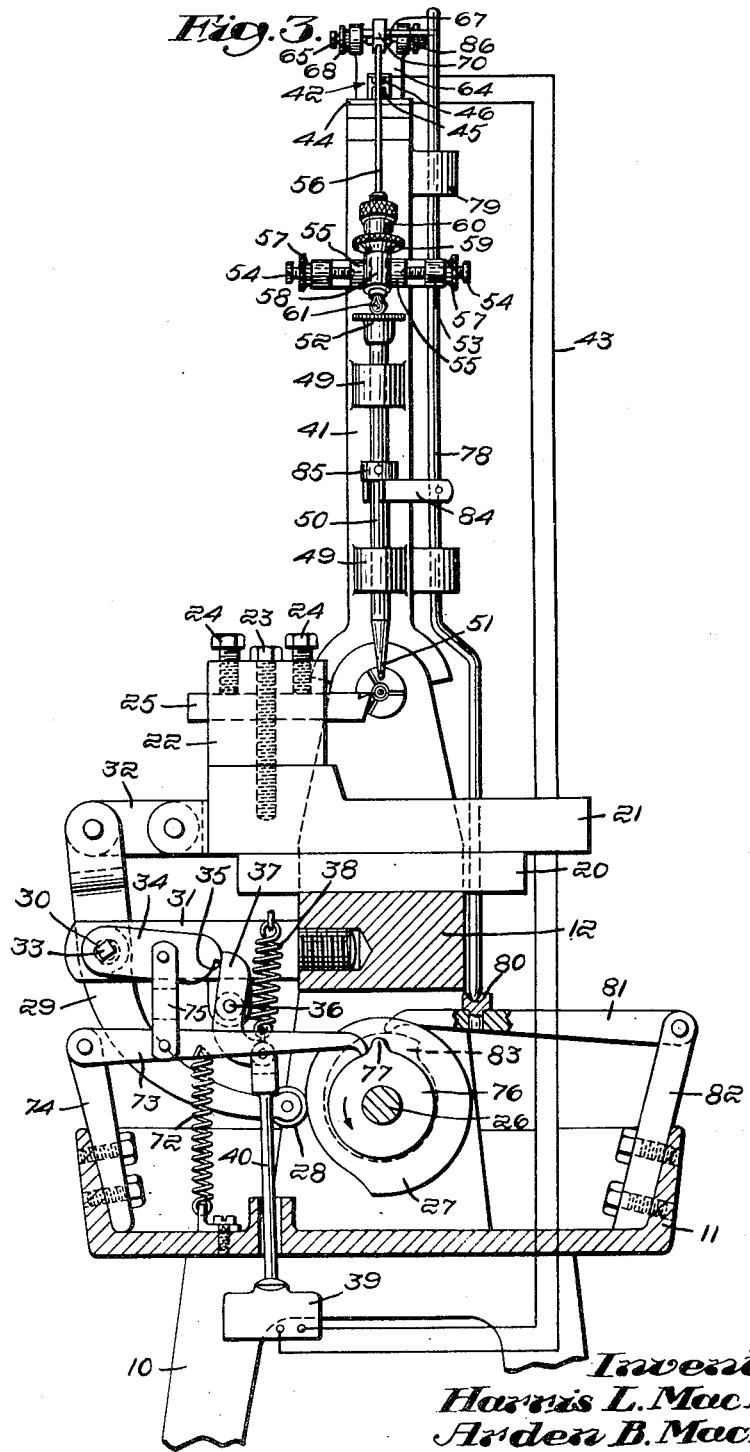

April 24, 1945. H. L. MacNEILL ET AL 2,374,365
TURNING MACHINE CONTROLLED BY THE DIAMETER OF THE WORK
Filed Aug. 30, 1944 5 Sheets-Sheet 4
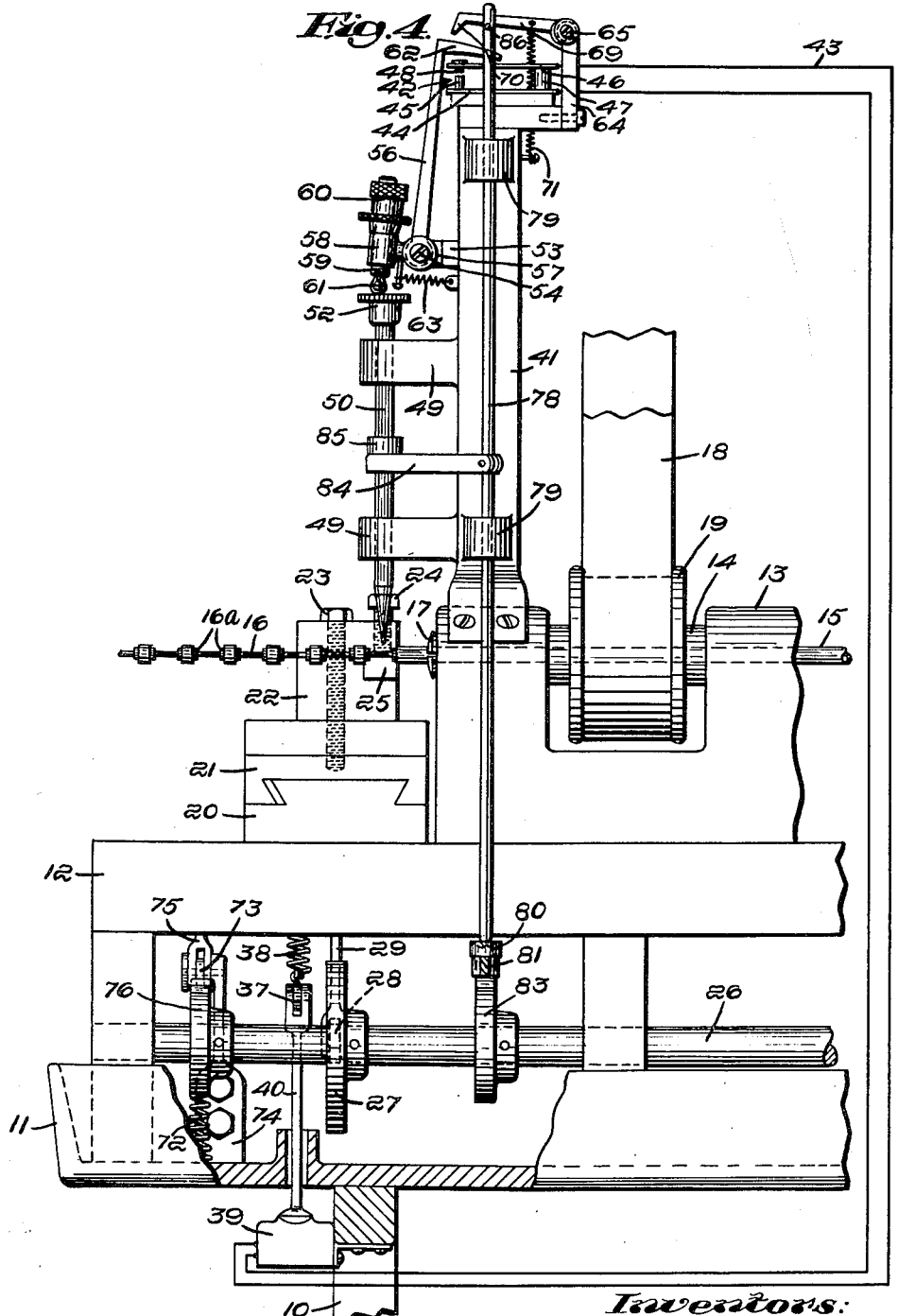
Inventors:
Harris L. MacNeill,
Arden B. MacNeill,
by Spear, Rawlings & Spear
Attorneys

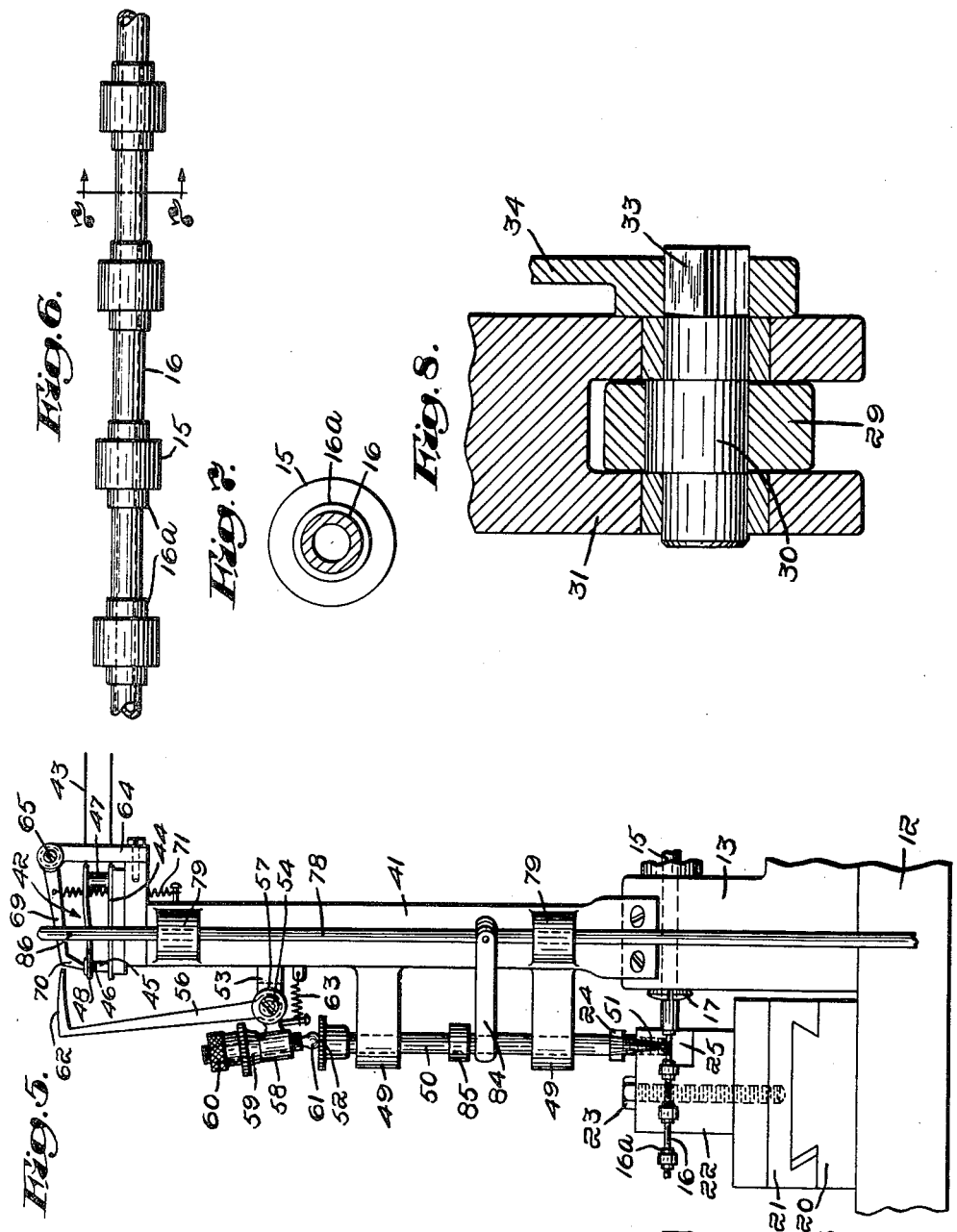

Patented Apr. 24, 1945

2,374,365

UNITED STATES PATENT OFFICE 2,374,365

TURNING MACHINE CONTROLLED BY THE DIAMETER OF THE WORK

Harris L. MacNeill and Arden B. MacNeill, Waltham, Mass., assignors to Harris Harold MacNeill and Arden B. MacNeill, both of Waltham, Mass., as joint tenants Application August 30, 1944, Serial No. 551,960

13 Claims. (Cl. 82—24)

Our present invention relates to novel machines for turning or grinding diameters to close tolerances.

In former machines, a rotating cam continuously advanced the tool against the rotating work until the roller of the feed lever ran off the cam at a fixed point. With such machines, it was difficult to produce work within the allowed tolerances. This was particularly true as the tools became dull.

In accordance with our invention, the cam actuated means to feed the tool against the work is continuously under the control of a gravity or spring operated feeler gage which closes a switch in a circuit to a solenoid when the work is within desired tolerances. When the solenoid is energized it renders the cam actuated means inoperative. We accomplish this result by causing a shift in position of the pivot for the feed arm to relieve the tool from the operating pressure of the cam. In addition, we provide cam controlled means to re-position the feeler gauge and re-position and lock the pivot in its operative position before the cam causes the tool to operatively engage new work.

As the operation of our machine is automatically controlled by the continuous gauging of the stock, our invention ensures great accuracy and long use of the tool without the necessity of resharpening it, thereby providing for efficiency and economy in use.

In the drawings we have shown an illustrative embodiment of our invention from which these and other of its novel features and advantages will be readily apparent. In the drawings:

Fig. 2 is a fragmentary, partly sectioned side view of the machine showing the parts in the same position as in Fig. 1.

Fig. 3 shows, in a view generally similar to Fig. 1, the relation of the parts when the feeler gauge has rendered the cam actuated means inoperative and said gauge is being re-set.

Fig. 4 is a view similar to Fig. 2, but showing the parts in the same position as in Fig. 3.

Fig. 5 shows the position of the feeler gauge when it becomes operative to dominate the cam-actuated means.

Fig. 6 shows a portion of the work.

Fig. 7 is a cross-section along the line 7—7 of Fig. 6, and

Fig. 8 is a fragmentary section along the line 8—8 of Fig. 1.

Figure 1:
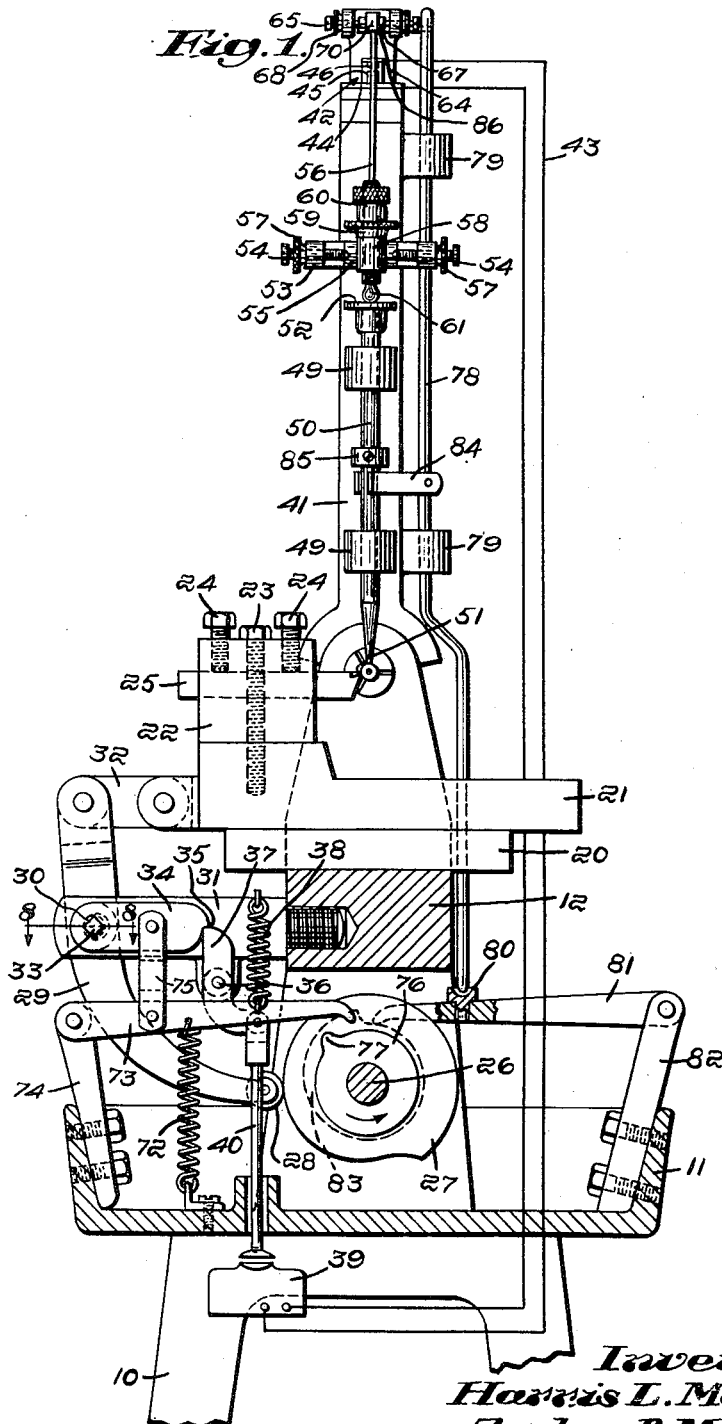
Fig. 1 is a fragmentary, partly sectioned end view of a machine in accordance with our invention showing the relation of the parts when the cam actuated means is advancing the tool against the work which is continuously being measured by the feeler gauge.

A machine in accordance with our invention comprises supporting structure for rotatable work supporting means, a tool holder adapted to carry the tool towards and away from the work at right angles to its axis with the tool being supported in a plane inclusive of such axis, and cam-actuated means to continuously advance the tool against the work. While the advancement of the tool is cam controlled, we provide gauge means controlled by the work as it is being turned to render the cam-actuated means inoperative when the work has been turned within permitted tolerances. Our invention also includes means to again set the cam-actuated means and the work controlled gauge means for re-operation as the cam in control of the cam actuated means completes its revolution.

The work and tool supporting means

A machine, in accordance with our invention may conveniently comprise a base or frame 10 supporting an oil pan 11 and a bed 12.

The bed 12 supports a head 13 in which the head spindle 14 is suitably journalled. The head spindle 14 shown in the drawings is hollow to receive the stock 15 which is in the form of a rod, portions of which are to be turned to predetermined reduced diameters as at 16 and 16a (Fig. 6). The stock 15 may be fed in any desired way and the spindle 14 has a work holding chuck or collet 17. The spindle 14 is shown (Figs. 2 and 4) as being continuously rotated by the belt 18 trained over the spindle pulley 19.

The bed 12 also has a slide rest 20 supporting the slide 21 so that it may move towards or away from the work at right angles to its axis. A tool post 22 is bolted as at 23 to the slide 21 and detachably clamped therein by bolts 24 is the tool 25 supported in a plane inclusive of the axis of rotation of the work.

Cam actuated feed for the tool 25

A cam shaft 26 continuously driven by any suitable means, is journalled in the bed 12. Fast on the shaft 26 is a cam 27 in contact with which is a roller 28 on one end of the feed arm 29 pivotally mounted on a pivot 30 eccentrically journalled in a yoke 31 on the bed 12 (see Fig. 8). A link 32 is pivotally connected to the other end of the feed arm 29 and to the slide 21. The cam 27 is shaped to cause, as it rotates, the continuous advancement of the tool against the work from an inoperative position until the low part of the cam relieves the pressure from the tool 25.

The normal action of the cam 27 on the tool 25 is dependent on the pivot being in its normal position as shown in Fig. 1. The pivot 30 is rotatable in the yoke 31 and when rotated clockwise from its position shown in Fig. 1 to its position shown in Fig. 3, by means later described in connection with re-setting of the cam-actuated means, the feed arm 29 is re-positioned, due to the eccentricity of the pivot 30, to relieve the cutting pressure on the tool 25. We provide latch means to hold the pivot 30 in a predetermined position against such partial rotation. We accomplish this by forming one end of the eccentric pivot 30 with a square end 33 to which we attach a dog 34, the free end of which is formed as at 35 to establish a shoulder. See Figs. 1, 3 and 8.

Pivoted at 36 to the support 31 is a pawl 37, one end of which is adapted to engage with the shoulder 35 to lock the dog 34 against turning. The other end of the pawl 37 is under the influence of a spring 38 attached to the support 31 to urge the pawl 37 into its dog locking position.

*The work controlled means to render inoperative the cam-actuated means*

The action of the spring 38 on the pawl 37 is overcome by a solenoid 39 on the base 10, the plunger 40 of which is pivotally connected to the pawl 37.

At 41, we have indicated a support bolted to the head 13 on the top of which is positioned a normally open switch, generally indicated at 42, in control of the circuit 43 to the solenoid 39.

The switch 42 may conveniently comprise a contact plate 44 having a contact point 45 and a contact spring 46 spaced from the contact plate 44 by the insulated support 47. The contact spring 46 has a contact point 48 engageable with the contact point 45. Due to the resilience of the contact spring 46, the switch 42 has a normally open position.

The support 41 has a pair of guides 49 vertically alined with the work being turned by the tool 25. Slidably supported by the guides 49 is a feeler 50 having a point 51 to engage with the work. As here shown, the feeler engages the work under the influence of gravity, but obviously might be spring-controlled. We form the upper end 52 of the feeler 50 to establish a flat, polished and hardened head.

Attached to the support 41 is a yoke 53 having transversely alined threaded apertures into which are threaded screws 54 having hardened points entrant of complemental recesses in the hub 55 of the bell crank lever 56 to establish a pivot therefor. The screws 54 are held in position by lock nuts 57.

The short arm of the bell crank 56 supports a holder 58 which has a threaded bore to receive an adjusting screw 59 held in its adjusted position by a lock nut 60. The bottom end 61 of the adjusting screw 59 is ball shaped and is disposed to engage with flat head 52 of the feeler 50. Such movement is permitted only as the feeler 50 drops to follow the surface of the work being turned.

On the side of the support 41 opposite the feeler 50 and the bell crank 56, we provide a yoke 64 having transversely alined threaded apertures to receive screws 65 the hardened points of which enter complemental recesses in the hub 67 to establish a pivot therefor. The screws 65 are locked in place by lock nuts 68. The hub 67 has an arm 69, the end of which is formed as a head 70 disposed to be supported by the shoulder 62 until the bell crank 56 swings under the influence of the spring 63 into a position in which the head 70 is disengaged therefrom (Fig. 5). When thus released from the shoulder 62, the head 70 engages the contact spring 46 to bring the switch points 45 and 48 together. To ensure the closing of the normally open switch 42, we provide a spring 71 attached to the support 41 and connected to the arm 69.

By this construction, once the adjusting screw 59 is accurately set, the bell crank 56 swings as the feeler 50 follows the work until, when the work has been turned within acceptable tolerances, the head 70 drops from the shoulder 62 to close the switch 42 to energize the solenoid 39 to disengage the pawl 37 from the dog 34. See Fig. 5.

The dog 34 is turned when thus unlocked by the influence of the spring 72 (see Figs. 1 and 3) which is connected to an arm 73 pivotally connected to a bracket 74 on the pan 11. A link 75 is pivotally connected to the arm 73 and to the dog 34. The end of the arm 73 is adapted to engage with a cam 76 fast on the cam shaft 26 when the dog 34 is unlatched and turned to render the cam controlled cutting means inoperative. When the dog 34 is turned by the spring 72 into the position shown in Fig. 3, it holds the pawl 37 against movement by the spring 38.

*The means to re-set the cam-actuated and the work controlled means*

The cam 76 has a high point 77 operative to engage with and raise the end of the arm 73 when the dog 34 is unlatched and to raise the dog 34 through the link 75 until the spring 38 is free to re-position the pawl 37 in its locking position (Fig 1). As will be apparent from Fig. 3, the spring 38 is inoperative until the normal position of the dog 34 has been thus restored. This operation takes place when the low part of the cam 27 is in control of the feed arm 29 at which time the tool 25 is relieved of pressure.

At the same time as the dog 34 is re-locked, the feeler 50 is raised from its position of Fig. 5 to its original position (see Fig. 2). We accomplish this result by mounting a rod 78 in vertically alined guides 79 on the support 41. The bottom end of the rod 78 rests in a cup-shaped seat 80 in a lever 81 pivotally connected to a bracket 82 on the edge of the pan 11.

The free end of the lever 81 rides on a cam 83 shaped to raise the rod 78 as the low part of the cam 27 engages the feed arm 29.

Clamped to the rod 78 is an arm 84 disposed to engage with a collar 85 adjustably locked to the feeler 50. The rod 78 has, adjacent its upper end, a pin 86 engageable with the arm 69. By this construction (see Fig. 4) as the rod 78 raises, the feeler 50 is raised causing the bell crank 56 to swing to a position in which the shoulder 62 will hold the head 70 remote from the contact spring 46. Slightly in advance of this, the pin 86 on the rod 78 has engaged and lifted the arm 69 to permit the movement of the shoulder 62 into a position in which it supports the head 70.

*Operation*

The operation of machines in accordance with our invention will be readily understood.

Assuming the stock 15 has been positioned to present a new portion thereof to be turned by the tool 25, the various elements are in their positions as represented in Figs. 1 and 2. The tool 25 is being advanced against the work by means of the action of the cam 27 on the feed arm 29. The arm 73 is remote from the cam 76 and the rod 78 is supported by the lever 81 which is riding on the low part of the cam 83.

As shown in Fig. 2, the switch closing head 70 of the spring influenced arm 69 is riding on the shoulder 62 of the bell crank 56 and the shoulder 62 is swinging away from such a position as the feeler 50 drops to follow the work thereby permitting the spring 63 to rock the bell crank 56 until the head 70 drops from the shoulder 62 to close the switch 42 as shown in Fig. 5.

It will be understood that the adjusting screw 59 has been set in relation to the axis of the work to establish the closing of the circuit to the solenoid 39 when the work, as measured by the feeler 50 and the bell crank 56, is within desired tolerances. Such closing of the circuit takes place before the tool 25 has been advanced the entire amount possible under the influence of the cam 27.

When the solenoid 39 is energized, the pawl 37 is immediately moved into its unlocked position (see Fig. 3) so that the dog 34 may be turned by the spring 72 until the arm 73 rests on the cam 76.

When the low part of the cam 27 is in control of the feed arm 29, the high part of the cam 76 actuates the arm 73 to raise the dog 34 into a position in which the pawl 37 may relock under the influence of the spring 38. At the same time, as shown in Fig. 4, the rod 78 raises to lift the feeler 50 and the arm 69 as shown in Fig. 4 and at this moment, the conventional work feed mechanism, not shown, is actuated to feed the stock 15 one step ahead and the cycle of operations is completed.

In Figs. 6 and 7 we have shown turned work. The tool 25 is formed to establish the shoulder 16a. After a rod 15 has been turned as at 16 and 16a, it is then cut into the desired pieces.

Conclusion

It will be apparent from the foregoing that our invention provides accurate and efficient means of turning or grinding diameters to very close tolerances through the work controlled gauging means for rendering the cam-actuated tool inoperative and through the cam controlled re-setting means, thus accomplishing the principal objectives of our invention, namely, reliability and accuracy in the turning or grinding of work, simplicity in the re-settings of the tools, and the maintenance of uniform production of work in long runs.

What we therefore claim and desire to secure by Letters Patent is:

1. A machine for cutting diameters to close tolerances, comprising a support, rotatable work holding means on said support, a tool, means on said support holding said tool in a plane inclusive of the work axis and for sliding movement at right angles thereto, a rotatable cam, means actuated by said cam and connected to said tool holding means to continuously advance said tool through a predetermined stroke against the work, control means to render said cam-actuated means inoperative, a feeler gauge in contact with the work and operating said control means when the diameter of the work as measured by said gage is within desired tolerances, and cam-controlled means timed with said cam to render said cam-actuated means operative and to re-position said control means and said gage before said cam initiates another cutting stroke.

2. A machine for cutting diameters to close tolerances, comprising a support, rotatable work holding means on said support, a tool, means on said support holding said tool in a plane inclusive of the work axis and for sliding movement at right angles thereto, a rotatable cam, means including a cam-actuated feed arm connected to said tool holding means to continuously advance said tool through a predetermined stroke against the work, a pivot for said feed arm mounted on said frame for movement from an operative position in which pressure is applied to said tool by said cam to an inoperative position in which said tool is relieved of pressure, means locking said pivot in its operative position, means to move said pivot into its inoperative position when said locking means is unlocked, a feeler gage carried by said support to contact and follow the work as it is being turned by said tool, means connected to said locking means and operated by said gage when the diameter of the work is within desired tolerances as measured by said gage to unlock said locking means to permit said pivot moving means to be operative, and cam-controlled means operative when said cam is in a position to have completed the stroke of the tool to actuate said pivot moving means to return said pivot to its operative position and to re-position said gage and said gage operated means before said cam initiates another stroke of said tool.

3. A machine for cutting diameters to close tolerances comprising a support, rotatable work holding means on said support, a tool, means on said support holding said tool in a plane inclusive of the work axis and for sliding movement at right angles thereto, a rotatable cam, means including a cam-actuated feed arm connected to said tool holding means to continuously advance said tool through a predetermined stroke against the work, an eccentric pivot for said feed arm rotatably mounted on said frame, a dog on said pivot, means locking said dog to hold said pivot in a position in which pressure is applied to said tool by said cam as it rotates, spring-actuated means connected to said dog to turn said pivot when said dog locking means is unlocked to position said feed arm to relieve said tool of pressure, a feeler gage carried by said support to contact and follow as it is being turned by said tool, means connected to said locking means and operated by said gage when the diameter of the work is within desired tolerances as measured by said gage to unlock said locking means to permit said pivot moving means to be operative, and cam controlled means operative when said cam is in a position to have completed the stroke of the tool to turn said dog into a position to be engaged by said locking means and to re-position said gage and said gage operated means when said cam initiates another stroke of said tool.

4. A machine for cutting diameters to close tolerances, comprising a support, rotatable work holding means on said support, a tool, means on said support holding said tool in a plane inclusive of the work axis and for sliding movement at right angles thereto, a rotatable cam, means including a cam-actuated feed arm to continuously advance said tool through a predetermined stroke against the work, a rotatable pivot for said feed arm eccentrically mounted in said support, a dog on said pivot, a locking pawl pivoted to said support, a spring connected to said pawl and normally urging said pawl into locking engagement with said dog, a solenoid connected to said pawl to move when energized said pawl out of locking engagement with said dog, a control arm pivotally connected to said support, a link pivotally connecting said control arm to said dog, a spring connected to said control arm, said spring being operative to turn said dog when said pawl is disengaged therefrom, a work-following feeler gage in contact with the work, a circuit to said solenoid, said circuit including a normally open switch, means operated by said gage to close said switch when the diameter of the work as measured by said gage is within desired tolerances, second and third cams timed with said first-named cams, said second cam being operative to raise said control arm to turn said dog into a position in which it is locked by said pawl under the influence of said pawl controlling spring, and means operable by said third cam to raise said feeler gage and to re-position said gage-operated means when said first cam is in a position to initiate another stroke of said tool.

5. The machine of claim 4, in which the second cam has a surface engageable by the control arm to limit the movement of the control arm by the control arm operating spring.

6. A machine for cutting diameters to close tolerances comprising a support, rotatable work holding means on said support, a tool, means on said support holding said tool in a plane inclusive of the work axis and for movement at right angles thereto, a rotatable cam, means including a cam-actuated feed arm connected to said tool holding means to advance said tool through a predetermined stroke against the work, an eccentric pivot for said feed arm rotatably mounted on said frame, a dog on said pivot, a spring-actuated pawl pivotally mounted on said support to lock said dog to hold said pivot in a position in which pressure is applied by said cam to said tool, means to move said pawl into a position in which said dog is unlocked, spring actuated means connected to said dog to turn said pivot to relieve the tool of pressure, a work-following feeler gage in contact with the work, means controlled by said gage to actuate said pawl moving means when the diameter of the work is within desired tolerances as measured by said gage, and cam-controlled means operative when said cam is in a position to have completed a stroke of said tool and before a new stroke is initiated to actuate said spring actuated means to turn said dog into a position to be locked by said spring actuated pawl and to raise and release said gage and re-position said gage operated means as said cam initiates a new stroke.

7. In a machine for cutting diameters to close tolerances, rotatable work supporting means, a rotatable cam, a tool, means including a feed arm to advance said tool through a predetermined stroke against the work as said cam rotates, pivot means supporting said feed arm in a first position in which said cam is operative to advance said tool and shiftable into a second position in which said tool is relieved of operating pressure, a lock to hold said pivot means in said first position, means to move said pivot means into said second position when said lock is released, electrically operated means to release said lock, a support located adjacent the work, a switch on said support in control of said electrically operated means, a switch closing member mounted on said support to engage with and close said switch, a work following feeler slidably mounted on said support to engage and follow the work, a bell crank lever pivotally mounted on said support, one end of said lever having a shoulder holding said switch closing member remote from said switch, a spring in control of the other end of said lever urging said lever towards a position in which said switch closing member drops from said shoulder, means carried by said other end of said lever engageable with the upper end of said work feeler so that the position of said feeler relative to the work controls the influence of said spring on said bell crank, cam-operated means to raise said feeler, said bell crank and said switch closing member to open said switch and to re-set the switch closing member on said shoulder and to release said feeler when said first cam initiates another stroke, and cam operated means in control of said pivot moving means to return said first moving means when said first cam is positioned to have completed said stroke and said switch is open.

8. The machine of claim 7, in which the switch is normally open and a spring urges the switch closing member into switch closing position.

9. The machine of claim 7, in which the upper end of the work feeler has a flat head and the means carried by bell crank lever has a ball-shaped end engageable with the head.

10. The machine of claim 7, in which the means carried by the bell crank lever engageable with the upper end of the work feeler comprise a holder and a member adjustably threaded therein.

11. The machine of claim 7, in which the surface of the shoulder on the bell crank lever engageable by the switch closing member is arcuate with respect to the bell crank pivot.

12. The machine of claim 7, in which the arm of the bell crank having the shoulder is of substantially greater length than the arm supporting the feeler engaging means.

13. In a machine for cutting diameters to close tolerances, rotatable work supporting means, a rotatable cam, a tool, means including a feed arm to advance said tool through a predetermined stroke against the work as said cam rotates, pivot means supporting said feed arm in a first position in which said cam is operative to advance said tool and shiftable into a second position in which said tool is relieved of operating pressure, a lock to hold said pivot means in said first position, means to move said pivot means into said second position when said lock is released, electrically operated means to release said lock, a support located adjacent the work, a switch on said support in control of said electrically operated means, means to close said switch, gage means to lock said switch open, said gage means comprising a work following feeler slidably mounted in said support to engage with and follow the work, and spring actuated means urging said gage means into a predetermined position in which said switch is unlocked to render said switch closing means operative, said spring actuated means being in engagement with said feeler so that its operation is dependent on the relation of said feeler to the work, cam-operated means to raise said gage means to lock said switch open and to release said feeler when said first cam initiates a new stroke, and cam-operated means to actuate said pivot moving means to return said pivot to its first position when said switch is open and before the commencement of the new stroke.

HARRIS L. MacNEILL.
ARDEN B. MacNEILL.